(12) United States Patent
Duan et al.

(10) Patent No.: US 11,063,905 B2
(45) Date of Patent: Jul. 13, 2021

(54) SERVICE DETECTION FOR A POLICY CONTROLLER OF A SOFTWARE-DEFINED WIDE AREA NETWORK (SD-WAN)

(71) Applicant: Fortinet, Inc., Sunnyvale, CA (US)

(72) Inventors: Shangwei Duan, Vancouver (CA); Peixue Li, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 241 days.

(21) Appl. No.: 16/408,264

(22) Filed: May 9, 2019

(65) Prior Publication Data

US 2020/0358743 A1 Nov. 12, 2020

(51) Int. Cl.
*G06F 15/16* (2006.01)
*H04L 29/06* (2006.01)
*H04L 12/24* (2006.01)
*H04L 29/12* (2006.01)

(52) U.S. Cl.
CPC ...... *H04L 63/0209* (2013.01); *H04L 41/0893* (2013.01); *H04L 61/2557* (2013.01); *H04L 61/6018* (2013.01); *H04L 2463/144* (2013.01)

(58) Field of Classification Search
None
See application file for complete search history.

(56) References Cited

U.S. PATENT DOCUMENTS

| 10,924,452 | B1* | 2/2021 | Nikolayev | H04L 61/2038 |
| 2017/0364702 | A1* | 12/2017 | Goldfarb | H04L 63/14 |
| 2017/0366416 | A1* | 12/2017 | Beecham | H04L 45/50 |
| 2018/0167405 | A1* | 6/2018 | Comay | H04L 61/1511 |
| 2018/0287903 | A1* | 10/2018 | Joshi | H04L 67/10 |
| 2019/0297113 | A1* | 9/2019 | Yang | H04L 47/20 |
| 2020/0007495 | A1* | 1/2020 | Balamurugan | H04L 41/145 |
| 2020/0351238 | A1* | 11/2020 | Kandasamy | H04L 41/0893 |
| 2020/0351309 | A1* | 11/2020 | Warburton | H04L 67/18 |

\* cited by examiner

*Primary Examiner* — Phyllis A Book

(57) ABSTRACT

Systems and methods for detecting Internet services by a network policy controller are provided. According to one embodiment, a network controller maintains an Internet service database (ISDB) in which multiple Internet services and corresponding protocols, port numbers, Internet Protocol (IP) address ranges and singularity levels of the IP ranges are stored. The network policy controller intercepts network traffic and detects the Internet service of the network traffic. If an IP address of the network traffic falls in an IP range with highest singularity level and the protocol type, port number of the network traffic are matched in the ISDB, the corresponding Internet service is identified as the Internet service of the network traffic. The network policy controller further controls transmission of the network traffic based on the Internet service.

21 Claims, 5 Drawing Sheets

SERVICE DETECTION FOR A POLICY CONTROLLER OF A SOFTWARE-DEFINED WIDE AREA NETWORK (SD-WAN)

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to the field of network security techniques. In particular, various embodiments relate to service detection for a policy controller in a software-defined wide area network (SD-WAN).

Description of the Related Art

SD-WAN provides routing and WAN optimization infrastructure combined with a policy controller and overlay network software to enable services to customize network characteristics. For instance, SD-WAN provides the ability to ensure that a Unified Communication (UC) service always has the first priority for network connectivity, while giving secondary priority to regular traffic, such as web surfing. An efficient and accurate technique to identify services deserves much attention for SD-WAN to achieve its functionalities.

Traditionally, services are identified by matching a single transmission control protocol/Internet protocol (TCP/IP) port number or IP address of the traffic against pre-determined values. For instance, TELNET has a well-known TCP port number 23, so the SD-WAN policy controller could reasonably assume that all traffic to port 23 is TELNET. Hence, all traffic to TCP port 23 are handled according to the TELNET profiles by the policy controller. The technique is simple and efficient with high performance. However, this assumption is too simple to distinguish among many services, especially for the rapidly growing cloud based services which could share the same Transmission Control Protocol/User Datagram Protocol (TCP/UDP) port or IP address. For instance, both Facebook™ and Twitter™ use TCP port 80 and 443. As such, a policy controller cannot distinguish between Facebook traffic and Twitter traffic simply by checking the TCP port of the traffic at issue.

Intrusion Prevention Systems (IPSs) work at the application layer and identify services by comparing traffic with pre-configured and predetermined service patterns (signatures), or comparing observed events with pre-determined profiles of generally known definitions. As the observations and identifications performed by IPSs provide very high accuracy, an IPS can be introduced within the SD-WAN system to achieve better service detection accuracy; however, IPSs consume a large amount of resources to maintain the service patterns and profiles and can therefore greatly reduce network throughput as compared to the traditional technique as it works in the application layer, while the traditional technique works in the network layer. In practice, IPS plays as supplement of the single port and IP address matching.

An Internet Service database (ISDB) has been introduced by an SD-WAN policy controller, such as a FortiGate next generation firewall available from the assignee of the present invention, to balance the accuracy and efficiency. In this database, every service is mapped to a three-element tuple: protocol number, TCP/UDP port number and IP address. The service is identified by matching the three elements simultaneously. Its correctness is based on the assumption that although different services could share the same port or IP address, a service can be uniquely determined by the combination of a specific IP address, protocol number and TCP/UDP port number. Like the traditional technique, this technique works in the network layer, but it improves the accuracy of service identification over performing single port or address matching without much loss of performance.

One shortcoming of the three-element tuple technique, however, is the number of combinations may be too large to use in a network device with limited memory. It has been observed that contiguous IP addresses usually provide the same service, therefore they are combined together to form an IP address range to reduce the number of entries in the ISDB. The tuple, therefore, evolves to <protocol number, port number, IP address range> from <protocol number, port number, IP address>. This approach works well in practice. Unfortunately, however, some IP address ranges may overlap among different companies or be taken by one service although it has been claimed by another service. For instance, Amazon Web services (AWS) may claim IP address range 1 as its own IP address range. Some days later, company-A buys services from AWS and a smaller IP range 2, which is covered by IP range 1, is assigned to the buyer. At this time, IP address range 2 is overlapped by IP address range 1. Therefore, the IP address range approach cannot distinguish between AWS and company-A provided services for traffic having an IP address within IP address range 2. Theoretically, a large IP address range could be split into a number of smaller ranges or IP addresses. If the large IP address range could be split to multiple smaller ranges without overlapping, and a smaller IP address range is exclusively assigned to a service or company, the deficiency of overlapping will be solved. However, this solution greatly increases the number of entries in the ISDB and also impacts the speed of retrieval from the ISDB at the same time.

Another shortcoming of the ISDB approach relates to botnets. For example, a botnet command and control (C&C) server machine may be located within a network that provides a well-known service and the IP address of the C&C server machine may fall within the IP address range of the well-known service. As a result, when an attack from the C&C server machine is identified by the policy controller, traffic originated from the botnet address will be regarded as both the botnet and the well-known service. The proposed solution of splitting a large IP address range into multiple smaller ranges will lead to worse consequences when applied to the above mentioned botnet-related problem as botnet addresses are usually a large set of individual IP addresses within IP address ranges.

SUMMARY

Systems and methods are described for detecting Internet services by a network policy controller. According to one embodiment, a network controller maintains an Internet service database (ISDB) in which a plurality of Internet services and corresponding protocols, port numbers, Internet Protocol (IP) address ranges and singularity levels of the IP ranges are stored. The network policy controller intercepts network traffic and detects the Internet service of the network traffic. If an IP address of the network traffic falls in an IP range with highest singularity level and the protocol type, port number of the network traffic are matched in the ISDB, the corresponding Internet service is identified as the Internet service of the network traffic. The network policy controller further controls transmission of the network traffic based on the Internet service.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
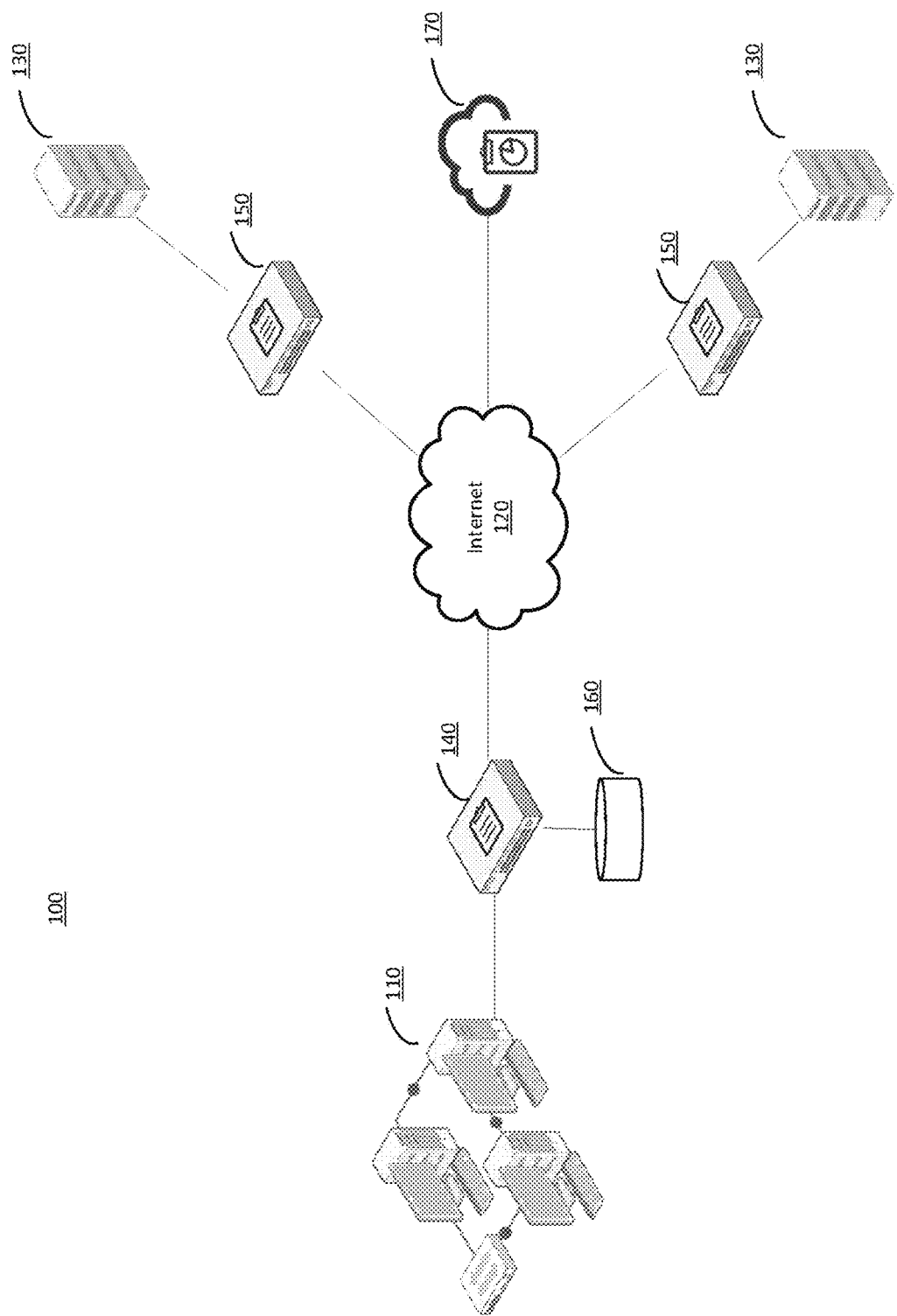
FIG. 1 illustrates an exemplary network architecture in which embodiments of the present invention may be employed.

Systems and methods are described for detecting Internet services by a network policy controller. According to one embodiment, a network controller maintains an Internet service database (ISDB) in which multiple Internet services and corresponding protocols, port numbers, Internet Protocol (IP) address ranges and singularity levels of the IP ranges are stored. The network policy controller intercepts network traffic and detects the Internet service of the network traffic. If an IP address of the network traffic falls in an IP range with the highest singularity level and the protocol type and the port number of the network traffic are matched in the ISDB, the corresponding Internet service is identified as the Internet service of the network traffic. The network policy controller further controls transmission of the network traffic based on the Internet service.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "cloud" generally refers to a public or private cloud infrastructure that delivers one or more services over a network (e.g., the Internet). Typically, the computer resources (hardware and software) of a cloud are hosted by a third party (the cloud provider). Examples of services that may be provided by a cloud include, but are not limited to, infrastructure, platform, software, network, storage, data, database, security, etc.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture 100 in which embodiments of the present invention may be employed. In the context of the present example, network architecture 100 includes a private network 110 which is connected to a network, such as the Internet 120. Private network 110 may comprise multiple computer devices, such as desktop computers, laptop computers, mobile devices and servers, that are connected by a local area network (LAN) or wireless LAN (WLAN). Computer devices of private network 110 can access multiple remote servers 130 through the Internet 120. Network traffic to be transmitted from/to private network 110 is intercepted by a network policy controller 140. An Internet service of the network traffic is detected by network policy controller 140 by matching of the IP address, protocol type and port number of the network traffic with records of an Internet service database (ISDB) 160. An example of a network policy controller 140 is described further below with reference to FIG. 2.

In one embodiment, in ISDB 160, Internet services are identified based on IP address ranges, protocols, port numbers and singularity levels of the IP address ranges. The singularity levels or weights are used to identify Internet services more accurately when IP address ranges are overlapped. According to one embodiment, a smaller IP address range contained within a larger overlapping IP address range is assigned a higher singularity level. When an IP address of network traffic is within an overlapped IP address range, the Internet service with the higher singularity level, that is also a more specific Internet service, is selected as the Internet service of the network traffic. For example, a cloud service provider, such as Amazon Web Services (AWS), Microsoft Azure and Google Cloud, possesses a large IP address range (IP address range 1) and provides virtual machines to customers. Cloud service providers may disclose IP address assignments to its Internet services periodically and network policy controller 140 may acquire IP address ranges and corresponding services and store Internet services of cloud service providers in ISDB 160. When a customer rents computers or virtual machines from the service provider to provide its own services, an IP addresses range (IP address range 2) of the virtual machines typically representing a small portion of the cloud service providers' much larger IP address range (i.e., IP address range 1) is assigned to the customer by the service provider. In accordance with an embodiment of the present invention, as IP address range 2 of the customer is encompassed by and contained within IP address range 1 of the cloud service provider, a higher singularity level is assigned to IP address range 2 and Internet services of the customer. When network traffic transmitted to computer or virtual machines of the customer is detected by network policy controller 140, the Internet service of the customer can be identified based on the assigned singularity level and the IP address of the network traffic despite the fact that the IP address falls within overlapping IP address ranges 1 and 2.

After the Internet services are detected, the network traffic may be controlled by network policy controller 140 based on network security policy of the private network 110, such as allow, block, or perform deep inspection.

In the present embodiment, remote servers 130 that can be accessed by client machines over the Internet may also be protected by network security appliances 150 and network traffic transmitted to/from remote servers 130 can also be inspected and logged by network security appliance 150. The logs of network security appliances 150 can be shared with network policy controller 140 of private network 110. Further, Internet services identified by network security appliances 150 may also be shared with network policy controller 140. In another example, a network security service 170, such as the FortiGuard or FortiCloud network security services available from the assignee of the present invention, may accumulate network traffic logs from network security appliances 140 and 150 and identify Internet services based on the signatures of the traffic logs collected over the Internet and generate an Internet service database, which may be shared with network security appliances 140 and 150.

In a further example, a computer within IP address range 2 may have been compromised to serve as or be under the control of a C&C server and the botnet may be identified by network policy controller 140, network security appliance 150 or other network security service provider. A record for the botnet and its IP address may be created in ISDB 160. As the IP address of the compromised computer is overlapped with IP address ranges 1 and 2, a highest singularity level may be assigned to this IP address. Therefore, in accordance with the present example, there are 3 singularity levels in ISDB 160. It is to be understood that there may be more singularity levels in ISDB 160 for overlapped IP ranges. For example, a virtual cloud service provider may rent computer resources from AWS and then lease them to other renters. In this case, there may be 4 singularity levels for overlapped IP ranges.

Figure 2:
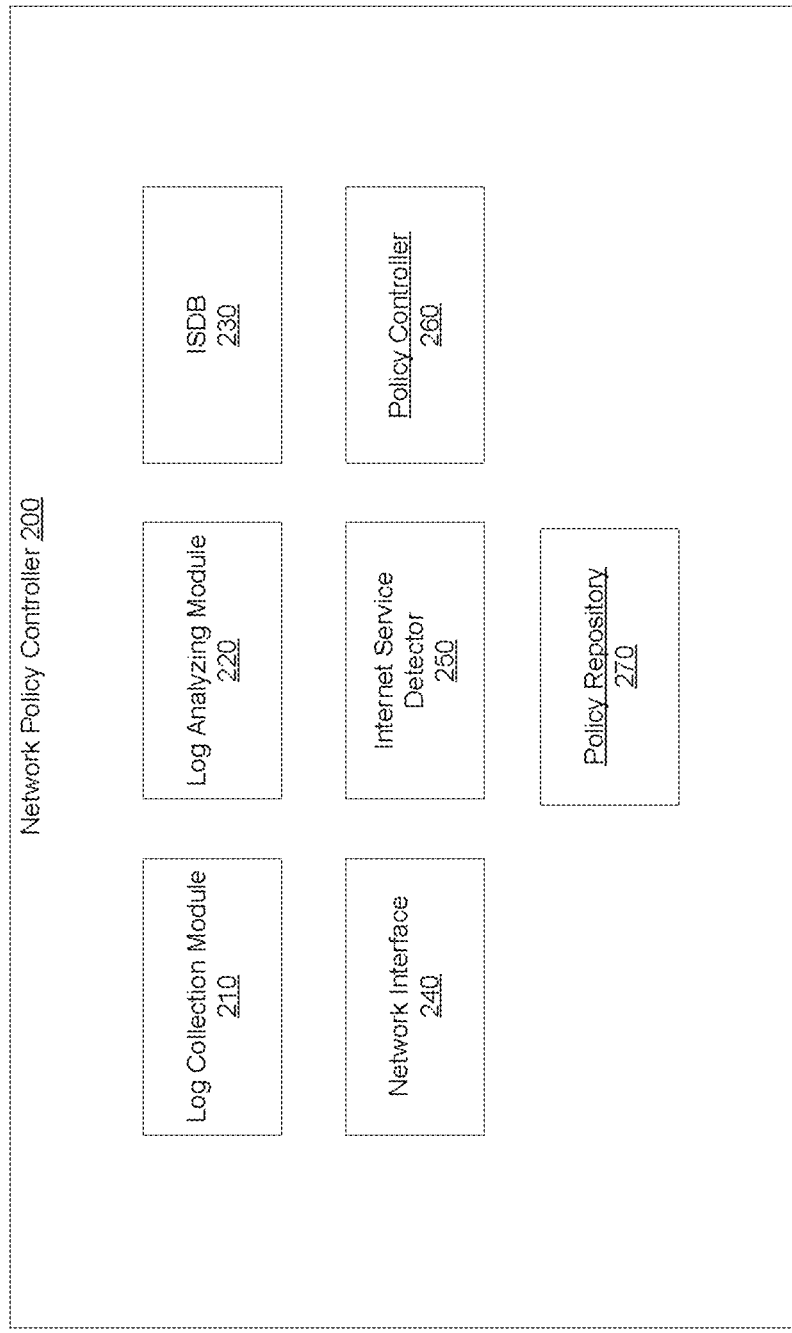
FIG. 2 illustrates exemplary functional units of a network security appliance in accordance with an embodiment of the present invention.

FIG. 2 illustrates exemplary functional units of a network policy controller 200 in accordance with an embodiment of the present invention. In the context of the present example, network policy controller 200 includes a log collection module 210, a log analyzing module 220, an ISDB 230, a network interface 240, an Internet service detector 250, a network policy controller 260 and a network policy repository 270.

Log collection module 210 is used for collecting network traffic information, such as network traffic logs, from network interface 240 or other network nodes over the Internet. Non-limiting examples of network nodes include network security appliance 150, servers 130, network security service 170 of FIG. 1, which may be deployed at the edges of local area networks or private/corporation networks to inspect and log network traffic going through the networks. Network traffic information or logs may include data packet headers that comprise source/destination IP addresses, port numbers and protocol types (TCP/UDP) of the network traffic.

In a further example, a cloud provider may disclose its IP address assignments and make them accessible online. For example, AWS may disclose IP address assignments to its cloud services, such as EC2, S3 and etc. Log collection module 210 may collect such IP assignment disclosures from cloud service providers.

In a further example, log collection module 210 may collect network traffic of domain name servers (DNS). The resolutions of domain names and IP addresses can be used for identifying Internet services.

Log analyzing module 220 is used for analyzing network traffic information/logs collected by log collection module 210 and extracting IP addresses, protocol types and port numbers of network traffic. Log analyzing module 220 may further collect information regarding IP address owners by analyzing DNS resolution records and/or IP address assignment disclosures by cloud service providers. Based on the information extracted by log analyzing module 220, IP address ranges, protocol type and port numbers of Internet services can be identified.

In another example, IPS running on network security appliances deployed at private/corporation networks or cloud-based network security services may inspect network traffic and identify Internet services based on signatures of the network traffic. Internet services including corresponding IP address ranges, protocol types and port numbers identified by IPS of network security appliances may be shared with log analyzing module 220.

In another example, log collection module 210 may collect Internet service information by actively scanning well-known Internet services. For example, an Internet service may distribute its service by a content delivery network (CDN). The Internet service may have different IP addresses at different geographical locations and the IP addresses may be changed over time by the CDN. To actively detect Internet services, multiple detective nodes can be distributed over different geographical locations and scan well-known Internet services, such as Gmail, YouTube, Office 365, AWS and etc. from different locations of the Internet in order to detect IP addresses, port numbers of these Internet services and changes of IP addresses of these services over times and locations. The detective nodes may send the Internet service information to log collection module 210.

After Internet services and corresponding IP address ranges are extracted or received from other sources, log analyzing module 220 may assign a singularity level or weight to each of the IP ranges. In one embodiment, the assigned singularity level reflects the nature of a service. So, for example, a higher singularity level may be used to represent a more specific service and a lower singularity level may be used to represent a more general service. For instance, AWS is a general-purpose cloud service, which is less specific than a company-provided service. A botnet address suggests this address has been hacked by some malware at this time, so it is very specific and could be assigned the highest singularity level. Continuing with this example, if an IP range belongs to a cloud service provider (e.g., AWS), it may be assigned to a lowest singularity level. If an IP range contains only one IP address, such as an IP address of a web server or an IP address of a compromised computer of a botnet, a highest singularity level is assigned to this IP range. A non-limiting example of the assignment of singularity levels to services is shown in Table 1 below.

TABLE 1

Example Singularity Assignment to Services

| Service | Singularity |
| --- | --- |
| Google-Web | 2 |
| Google-DNS | 2 |
| Google-Cloud | 1 |
| Google-Bot | 2 |
| Facebook-Web | 2 |
| Facebook-DNS | 2 |
| Facebook-SMTP(S) | 2 |
| Facebook-IMAP(S) | 2 |
| Facebook-POP3(S) | 2 |
| Apple-Web | 2 |

TABLE 1-continued

Example Singularity Assignment to Services

| Service | Singularity |
| --- | --- |
| Apple-DNS | 2 |
| Apple-SMTP(S) | 2 |
| Apple-IMAP(S) | 2 |
| Apple-POP3(S) | 2 |
| Yahoo-Web | 2 |
| Yahoo-DNS | 2 |
| Yahoo-SMTP(S) | 2 |
| Yahoo-IMAP(S) | 2 |
| Yahoo-POP3(S) | 2 |
| Microsoft-Web | 2 |
| Microsoft-DNS | 2 |
| Microsoft-SMTP(S) | 2 |
| Microsoft-IMAP(S) | 2 |
| Microsoft-POP3(S) | 2 |
| Microsoft-Office365 | 2 |
| Microsoft-Azure | 1 |
| Microsoft-Bing | 2 |
| Amazon-Web | 2 |
| Amazon-DNS | 2 |
| Amazon-SMTP(S) | 2 |
| Amazon-IMAP(S) | 2 |
| Amazon-POP3(S) | 2 |
| Amazon-AWS | 1 |
| Proxy.Server | 3 |
| Botnet.Server | 3 |
| Spamming.Server | 3 |
| Phishing.Server | 3 |

For example, the singularity levels may be the level of IP address ranges in the overlapped ranges. After singularity levels are assigned to IP ranges of Internet services, ISDB 230 can be generated by log analyzing module 220. In ISDB 230, Internet services and its corresponding IP ranges, protocol types, port numbers and singularity levels are stored. An example of the structure of ISDB 230 is shown in Table 2.

TABLE 2

Example ISDB Entries

| Service | Singularity | IP Range | Protocol | Port |
| --- | --- | --- | --- | --- |
| Google-Cloud | 1 | 35.236.0.0-35.247.255.255 | TCP, UDP | Any port |
| eBay-Web | 2 | 35.236.20.222 | TCP | 80, 443 |
| Microsoft-Azure | 1 | 40.80.168.0-40.82.67.255 | TCP, UDP | Any port |
| Instart-CDN | 2 | 40.81.62.211 | TCP | Any port |
| Microsoft-Azure | 1 | 40.91.64.0-40.91.255.255 | TCP, UDP | Any port |
| Bluejeans-Bluejeans.Meeting | 2 | 40.91.116.192-40.91.116.223 | TCP | 443, 1720, 5000, 5060, 5061 |
| Microsoft-Azure | 1 | 13.78.0.0-13.88.193.255 | TCP, UDP | Any port |
| Zscaler-Zscaler.Cloud | 2 | 13.79.33.253 | TCP, UDP | Any port |
| Amazon-AWS | 1 | 3.208.0.0-3.239.255.255 | TCP, UDP | Any port |
| Facebook-Web | 2 | 3.211.175.180 | TCP | 80, 443 |
| Amazon-AWS | 1 | 52.0.0.0-52.46.159.255 | TCP, UDP | Any port |
| Netflix-Web | 2 | 52.5.61.180 | TCP | 80, 443 |
| Amazon-AWS | 1 | 13.52.0.0-13.59.255.255 | TCP, UDP | Any port |
| Fortinet-Web | 2 | 13.56.55.78 | TCP | 80, 443 |

Figure 3:
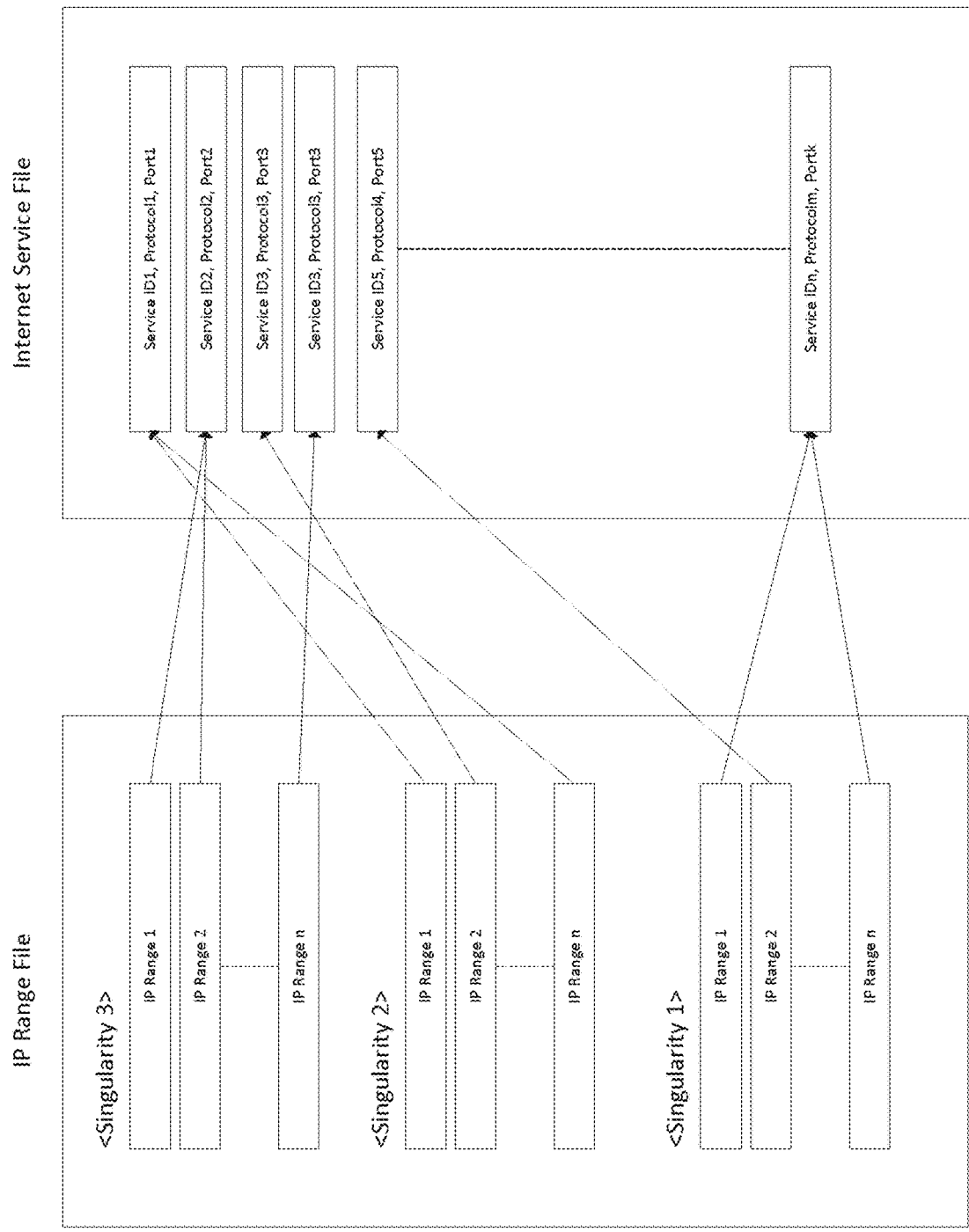
FIG. 3 illustrates a data structure of an Internet service database in accordance with an embodiment of the present invention.

In order to reduce the storage space, ISDB 230 can be split into multiple files, e.g., two files, an IP range file and an Internet service file. The Internet service file may be used for storing Internet services and corresponding protocol types and port numbers. The IP range file may include multiple sections for storing IP ranges of the same singularity levels. Each section may start with a tag denoting its singularity level and end with a tag denoting the end of section. All IP ranges under a singularity level are stored in its corresponding section in the IP range file. A pointer to the position of corresponding Internet service of each IP range in the Internet service file is also stored together with each of the IP address ranges in the IP range file. An example of the structure of the IP range file and Internet service file and mappings of IP ranges with Internet services in the two files is illustrated by FIG. 3. As each singularity level is stored only once in the IP range file, the size of ISDB 230 stored in the file structure shown in FIG. 3 is smaller than that of the structure shown in Table 2 (in which the singularity level is in each record and therefore stored multiple times).

Network interface 240 is used for intercepting network traffic to be transmitted to/from a network. Network traffic is forwarded to Internet service detector 250 for identifying Internet service of the network traffic.

Internet service detector 250 may inspect a data packet header of the network traffic to extract an IP address, protocol type and port number. For network traffic to be transmitted from a client machine to a server, the destination IP address is extracted. For network traffic to be transmitted from Internet services to client machines, the source IP address may be extracted. The IP address extracted from the data packet header is compared with IP address ranges in ISDB 230. When the IP address falls within overlapping IP address ranges, the IP address range with the highest singularity level is matched against the IP address. If the protocol type and port number of data packet are also matched with an Internet service in ISDB 230, the network traffic is identified as being the matched Internet service.

A non-limiting example of pseudo code for performing a matching process that can be used for the data structure of FIG. 3 is shown below:

```
for (level = max_singularity_level ; level >= min_singularity_level ; level = level - 1) {
    ip_range = binary_search_ip_range_within_area(level, traffic's dst);
    if (is_exist (ip_range)) {
        data_entry = ip_range→data_entry_location;
```

```
        if (data_entry_matches(data_entry, traffic's protocol, traffic's port))
            return data_entry→service_ID;
    }
}
```

In one embodiment (e.g., the embodiment depicted in FIG. 3), all IP address ranges with the same singularity level form a group. In this embodiment, when there are n levels of singularity, there are n groups. Each group may be ordered based on singularity from highest to lowest. Within each group, the IP address ranges may be ordered in the array. In the pseudo codes above, the first line scans all groups one by one. In the second line, a binary search is executed to find an IP address range for a given destination (dst). It is noted that this search process has very good performance. The time complexity is klog(n) (k is a constant and n is the number of IP address ranges of each group. The n has the same order of magnitude as the size of the ISDB). Alternatively, the IP address ranges could be organized using other data structures (e.g., a hash table or Trie or the like).

After Internet services of network traffic are identified by Internet service detector 250, policy controller 260 may control the transmission of the network traffic in accordance with network security policies stored in policy repository 270. Network traffic may be allowed, blocked or deep inspected may be performed based on the identified Internet services. Further, as Internet services can be quickly identified based on the 3-tuple together with singularity levels, policy controller 260 may implement SD-WAN routing based on Internet services of network traffic. For example, Internet services requiring lower latency, such as real-time video conferencing, may be routed first to high quality network connection while other Internet services, such as web surfing, can be routed with lower priority.

Figure 4:
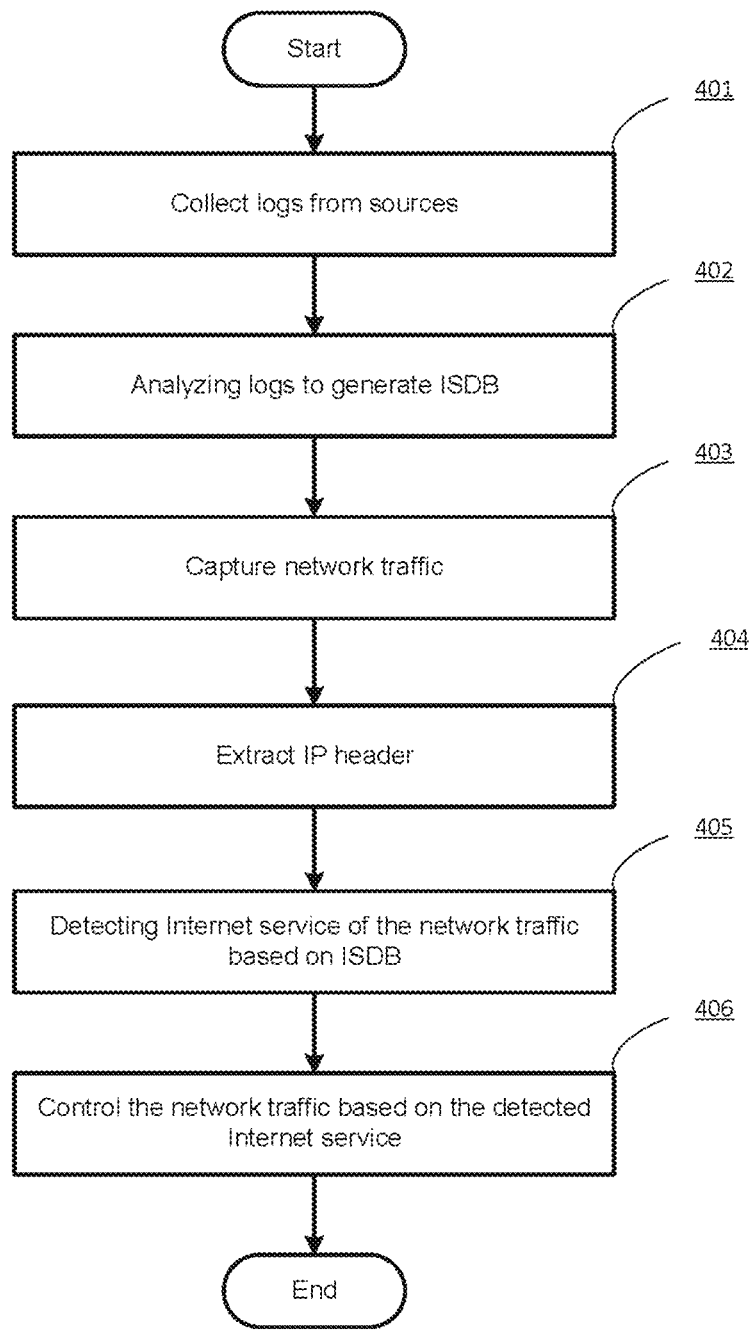
FIG. 4 is a flow diagram illustrating a method for detecting Internet services of network traffic and controlling network traffic in accordance with externally provided customized configuration settings in accordance with an embodiment of the present invention.

FIG. 4 is a flow diagram illustrating a method for detecting Internet services of network traffic and controlling network traffic in accordance with an embodiment of the present invention.

At block 401, network policy controller (e.g., network policy controller 140 or 200) may collect network traffic information, such as network traffic logs. The network policy controller may be a firewall that is deployed at a border of a private network and network traffic information through the private network can be collected by the firewall. In another example, network policy controller may be a cloud-based network security service (e.g., service 170) that collects network traffic information from network security appliances (e.g., network security appliance 150) deployed at edges of local area networks or private/corporation networks. Network traffic information or logs collected by the network policy controller may include data packet headers that comprise IP addresses, port numbers and protocol types (TCP/UDP) of the network traffic.

Network policy controller may further collect IP address assignment disclosures of cloud service providers. The IP address assignment disclosure may include IP address ranges and corresponding Internet services of cloud services providers. In a further example, DNS resolutions records of DNS servers can also be collected by the network policy controller. Further service detectors of the network policy controller deployed at different geographical locations can actively scan well-known Internet services to acquire corresponding IP addresses.

At block 402, network policy controller may analyze network traffic information/log and extract IP addresses, protocol types and port numbers of network traffic. IP address owners can also be acquired from DNS resolution records and/or IP address assignment disclosures by cloud service providers. By accumulating the extracted information, IP address ranges, protocol types and port numbers of Internet services can be identified. A singularity level or weight can be assigned to each IP range identified by network policy controller. The singularity level can be assigned based on its corresponding Internet service. IP ranges of cloud-based services may be assigned relatively lower singularity levels because they are more general as portions of the IP ranges can be further rented to customers of the cloud services. An IP range with a single IP address can be assigned to highest singularity level as it is the most specific and no further singularity levels can be assigned. When IP range overlapping is detected, higher singularity levels can be assigned to smaller IP ranges of the overlapped IP ranges. An ISDB (e.g., ISDB 160 or 230) can be generated by the network policy controller to store the Internet services and corresponding singularity levels, IP ranges, protocol types and port numbers.

At block 403, data packets to be transmitted to their respective destinations can be captured by the network policy controller.

At block 404, IP headers of data packets are extracted.

At block 405, a 3-tuple of the IP header (source or destination IP address, protocol types and port numbers) are matched with ISDB entries to find a corresponding Internet service. If the IP address of the IP header falls within overlapping IP address ranges, the IP address range with the highest singularity level is used to determine the corresponding Internet service.

At block 406, network traffic is controlled based on its determined Internet services by the network policy controller. For example, the network traffic can be allowed, blocked, inspected or routed according to a corresponding network policy.

Figure 5:
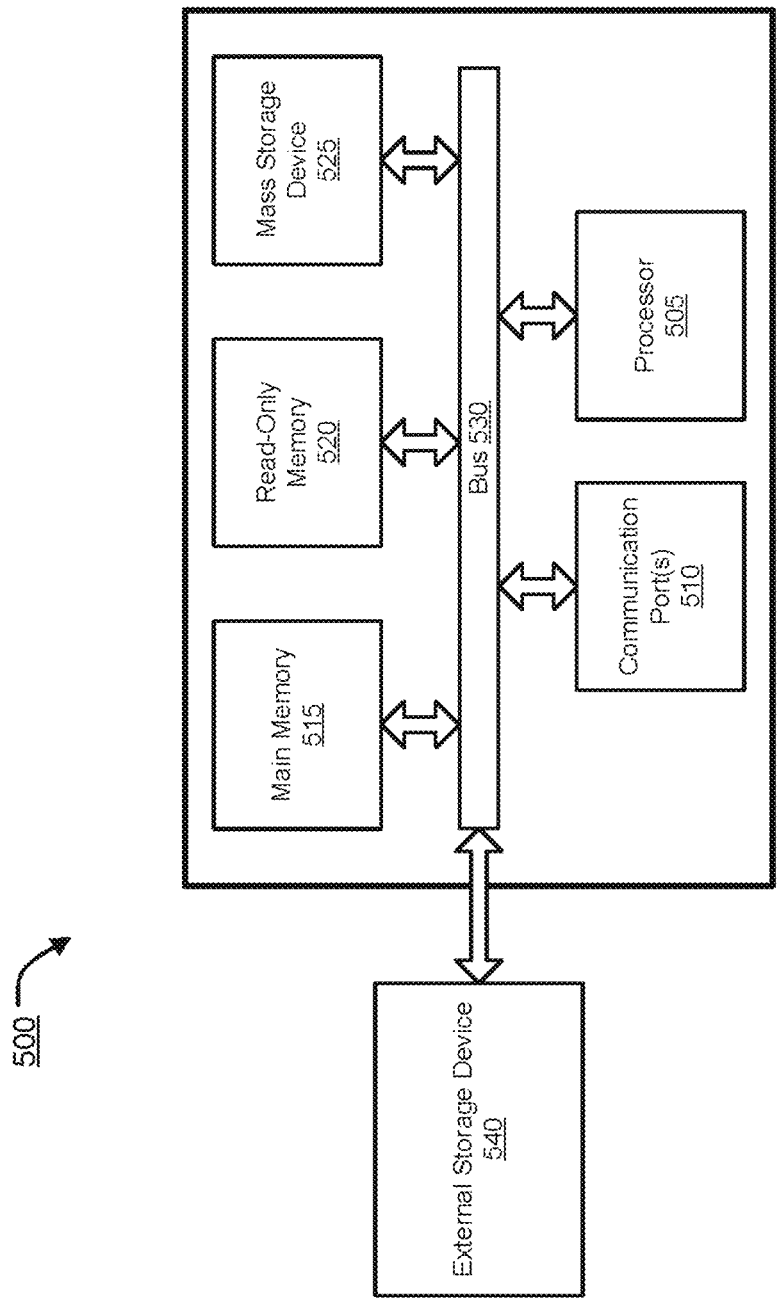
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a network appliance (e.g., network security device 150, network policy controller 140 or 200), a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® ZIP Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
maintaining, by a network policy controller associated with a private network, an Internet service database (ISDB), wherein the Internet service database comprises a plurality of Internet services identified by corresponding protocols, port numbers, Internet Protocol (IP) address ranges and singularity levels of the IP address ranges, wherein the singularity levels represent weights used to select among multiple overlapping IP address ranges;
intercepting, by the network policy controller, network traffic attempting to traverse the network policy controller;
extracting, by the network policy controller, a protocol, a port number, and an IP address of the network traffic;
identifying, by the network policy controller, one or more IP address ranges of the IP address ranges maintained by the ISDB within which the IP address falls;
when the one or more identified IP address ranges are overlapping IP address ranges, then selecting, by the network policy controller, an IP address range of the one or more identified IP address ranges having a highest singularity level; and
identifying, by the network policy controller, an Internet service associated with the network traffic by matching a data entry of the ISDB corresponding to the selected IP address range with the extracted protocol and the extracted port number.

2. The method of claim 1, wherein said maintaining further comprises:
checking, by the network policy controller, whether a plurality of IP address ranges are overlapping; and
when a result of the checking is affirmative, then assigning, by the network policy controller, singularity levels to the plurality of overlapping IP address ranges based on a relative specificity of the plurality of overlapping IP address ranges.

3. The method of claim 2, wherein a highest singularity level is assigned to an IP address range of the plurality of overlapping IP address ranges having a single IP address and a lowest singularity level is assigned to an IP address range of the plurality of overlapping IP address ranges associated with a cloud service.

4. The method of claim 1, further comprising acquiring, by the network policy controller, information regarding IP address range assignments to Internet services from a cloud service provider.

5. The method of claim 1, further comprising:
actively scanning, by the network policy controller, Internet services observed in network traffic of the private network to acquire information regarding IP address ranges of the Internet services; and
assigning, by the network policy controller, singularity levels to overlapping IP address ranges of the IP address ranges based on a relative specificity of the overlapping IP address ranges.

6. The method of claim 1, further comprising:
receiving, by the network policy controller, network traffic logs associated with the private network;
extracting, by the network policy controller, Internet services and corresponding protocols, port numbers and IP address ranges from the network traffic logs;
calculating, by the network policy controller, singularity levels of the IP address ranges based on overlapping of the IP address ranges; and generating, by the network policy controller, the ISDB based on the extracted Internet services and corresponding protocols, port numbers, IP address ranges and singularity levels.

7. The method of 6, wherein the network traffic logs are captured by a network security module of the network policy controller.

8. The method of 6, wherein the network traffic logs are captured by other network security appliances over the Internet.

9. The method of claim 1, further comprising controlling, by the network policy controller, transmission of the network traffic based on a network policy associated with the Internet service.

10. The method of claim 1, wherein the network policy controller comprises a software-defined wide area network (SD-WAN) policy controller.

11. A non-transitory computer-readable storage medium embodying a set of instructions, which when executed by one or more processors of a network policy controller associated with a private network, causes the one or more processors to perform a method comprising:
 maintaining an Internet service database (ISDB), wherein the Internet service database comprises a plurality of Internet services identified by corresponding protocols, port numbers, Internet Protocol (IP) address ranges and singularity levels of the IP address ranges, wherein the singularity levels represent weights used to select among multiple overlapping IP address ranges;
 intercepting network traffic attempting to traverse the network policy controller;
 extracting a protocol, a port number, and an IP address of the network traffic;
 identifying one or more IP address ranges of the IP address ranges maintained by the ISDB within which the IP address falls;
 when the one or more identified IP address ranges are overlapping IP address ranges, then selecting an IP address range of the one or more identified IP address ranges having a highest singularity level; and
 identifying an Internet service associated with the network traffic by matching a data entry of the ISDB corresponding to the selected IP address range with the extracted protocol and the extracted port number.

12. The non-transitory computer-readable storage medium of claim 11, wherein said maintaining further comprises:
 checking whether a plurality of IP address ranges are overlapping; and
 when a result of the checking is affirmative, then assigning singularity levels to the plurality of overlapping IP address ranges based on a relative specificity of the plurality of overlapping IP address ranges.

13. The non-transitory computer-readable storage medium of claim 12, wherein a highest singularity level is assigned to an IP address range of the plurality of overlapping IP address ranges having a single IP address and a lowest singularity level is assigned to an IP address range of the plurality of overlapping IP address ranges associated with a cloud service.

14. The non-transitory computer-readable storage medium of claim 11, wherein the method further comprises acquiring, by the network policy controller, information regarding IP address range assignments to Internet services from a cloud service provider.

15. The non-transitory computer-readable storage medium of claim 11, wherein the method further comprises:
 actively scanning Internet services observed in network traffic of the private network to acquire information regarding IP address ranges of the Internet services; and
 assigning singularity levels to overlapping IP address ranges of the IP address ranges based on a relative specificity of the overlapping IP address ranges.

16. The non-transitory computer-readable storage medium of claim 11, wherein the method further comprises:
 receiving network traffic logs associated with the private network;
 extracting Internet services and corresponding protocols, port numbers and IP address ranges from the network traffic logs;
 calculating singularity levels of the IP address ranges based on overlapping of the IP address ranges; and
 generating the ISDB based on the extracted Internet services and corresponding protocols, port numbers, IP address ranges and singularity levels.

17. The non-transitory computer-readable storage medium of 16, wherein the network traffic logs are captured by a network security module of the network policy controller.

18. The non-transitory computer-readable storage medium of 16, wherein the network traffic logs are captured by other network security appliances over the Internet.

19. The non-transitory computer-readable storage medium of claim 11, wherein the method further comprises controlling transmission of the network traffic based on a network policy associated with the Internet service.

20. The non-transitory computer-readable storage medium of claim 11, wherein the network policy controller comprises a software-defined wide area network (SD-WAN) policy controller.

21. A network policy controller, comprising:
 a processor;
 a network interface, communicatively coupled to the processor and to a data communication network; and
 a memory, storing:
  a first module to maintain an Internet service database (ISDB), wherein the Internet service database comprises a plurality of Internet services identified by corresponding protocols, port numbers, Internet Protocol (IP) address ranges and singularity levels of the IP address ranges, wherein the singularity levels represent weights used to select among multiple overlapping IP address ranges;
  a second module to intercept network traffic attempting to traverse the network policy controller;
  a third module to extract a protocol, a port number, and an IP address of the network traffic;
  a fourth module to identify one or more IP address ranges of the IP address ranges maintained by the ISDB within which the IP address falls,
  when the one or more identified IP address ranges are overlapping IP address ranges, then selecting an IP address range of the one or more identified IP address ranges having a highest singularity level, and identifying an Internet service associated with the network traffic by matching a data entry of the ISDB corresponding to the selected IP address range with the extracted protocol and the extracted port number.

\* \* \* \* \*